P. LIER.
DISK HOLDER OR REST.
APPLICATION FILED MAY 18, 1907.
911,507.
Patented Feb. 2, 1909.
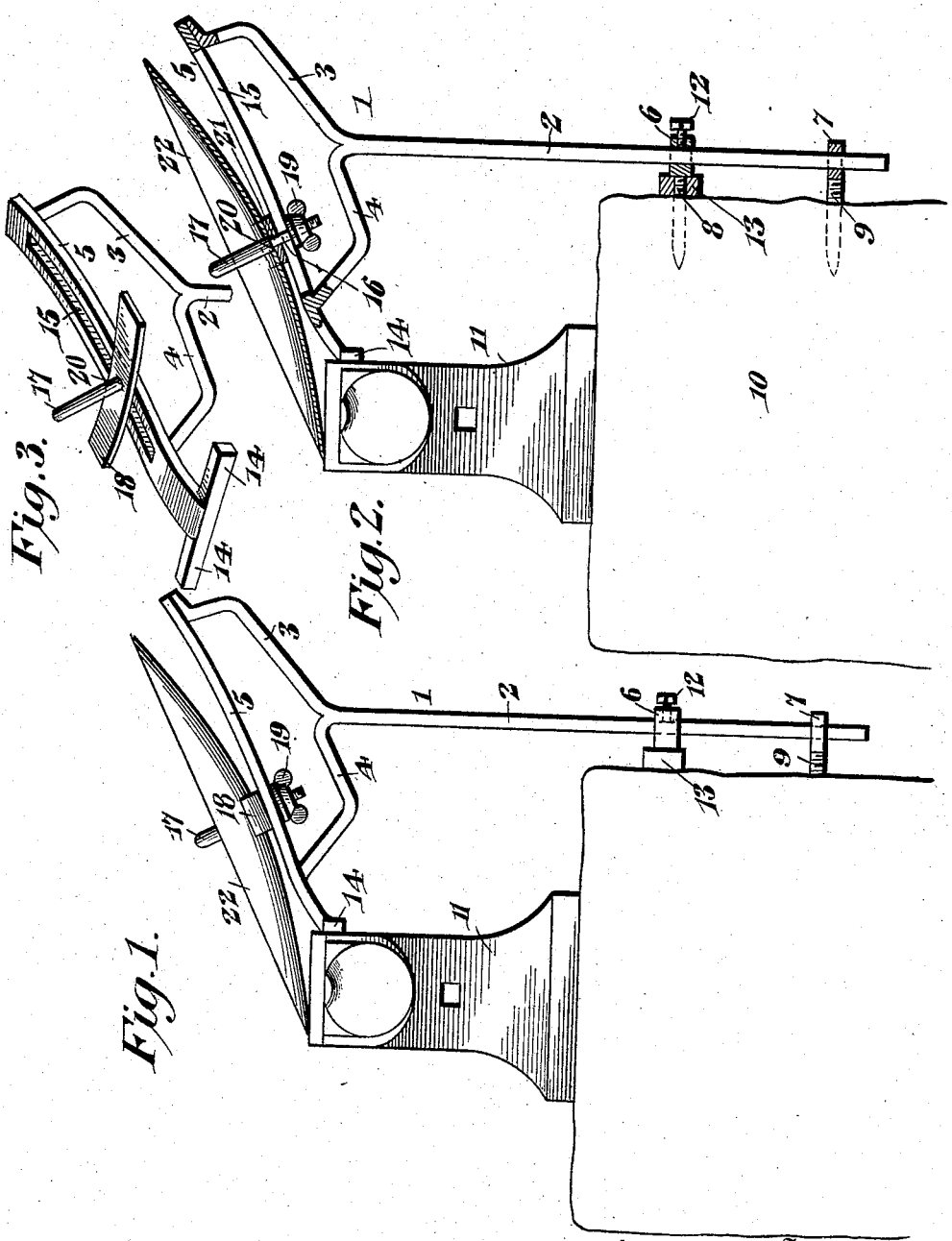

UNITED STATES PATENT OFFICE.

PAUL LIER, OF EMERSON, NEBRASKA, ASSIGNOR OF ONE-HALF TO GUS A. ISENBURG, OF EMERSON, NEBRASKA.

DISK HOLDER OR REST.

No. 911,507.  Specification of Letters Patent.  Patented Feb. 2, 1909.

Application filed May 18, 1907. Serial No. 374,347.

*To all whom it may concern:*

Be it known that I, PAUL LIER, a citizen of the United States, residing at Emerson, in the county of Dixon and State of Nebraska, have invented a new and useful Disk Holder or Rest, of which the following is a specification.

The invention relates to improvements in disk holders for sharpening cultivator and plow disks.

The object of the present invention is to improve the construction of disk holders or rests, and to provide a simple, inexpensive and efficient device of this character, adapted to save time and labor in handling disks while sharpening the same by hammering them out on an anvil.

A further object of the invention is to provide a disk holder or rest of this character, adapted to support a cultivator disk in proper position on an anvil for hammering the same, and capable of preventing a disk from jumping around the anvil and springing out of shape, while it is being operated on by either a hand or trip hammer.

Another object of the invention is to provide a disk holder, adapted to enable a cultivator and plow disk to be conveniently held with one hand, and capable of being readily removed for heating and replaced without detaching or adjusting any of the parts of the device.

The invention also has for its object to provide a disk holder or rest, which will possess great strength and durability, and which will not get out of order or lose its shape.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a side elevation of a disk holder or rest, constructed in accordance with this invention and shown applied to an anvil, a cultivator or plow disk being arranged in position for hammering. Fig. 2 is a vertical sectional view of the same. Fig. 3 is a perspective view of the upper portion of the device.

Like numerals of reference designate corresponding parts in all the figures of the drawing.

1 designates a vertically adjustable bracket, provided with a vertical stem or standard 2, having upwardly extending diverging or forked arms 3 and 4, which support the top 5 of the bracket. The stem or standard 2 is arranged in upper and lower eyes 6 and 7, having threaded shanks 8 and 9, which are embedded in a block 10, that supports an anvil 11. The eyes 6 and 7 are vertically alined, and a clamping screw 12 is mounted on the upper eye for engaging the stem or standard 2, as clearly illustrated in Fig. 2 of the drawing. A nut 13 is arranged on the shank of the upper eye, and is interposed between the former and the block to form an abutment for the upper eye.

The top 5 of the bracket consists of an inclined bar or member, which is slightly curved and which is provided at its lower end with laterally extending arms 14, forming a broad bearing for fitting against one side of the anvil 11, as clearly shown in Figs. 1 and 2. The top of the bracket is supported by the upper and lower arms, which are suitably connected with the top bar or member, and the latter is provided between the arms 3 and 4 with a longitudinal slot 15, through which passes a squared portion 16 of a reduced shank of a pivot 17. The shank, which pierces a transverse seat bar or member 18, has its lower portion threaded for the reception of a thumb nut 19, which clamps the pivot and the seat bar or member at any point between the supporting arms 3 and 4. A washer is preferably interposed between the thumb nut and the lower face of the top bar or member and the shoulder 20, formed by reducing the shank, engages the upper face of the transverse seat bar or member. The squared portion 16 of the shank fits the slot 15, and prevents rotary movement of the pivot and the seat bar or member, which is also provided with a rectangular perforation 21.

The seat bar or member 18, which extends laterally from opposite sides of the top bar or member of the bracket, is set at an inclination, and is curved longitudinally to conform to the curvature of a cultivator or plow disk 22, and it presents an upper concave face to the lower convex face of the disk 22. The pivot, which is inclined, projects upwardly from the seat bar or member and extends through the central opening of the disk 22, as clearly illustrated in Fig. 2 of the drawing, and the disk is supported at an inclination, with its lower edge resting upon the anvil, in position to be operated on by either a hand or trip hammer. The device will prevent the disk from jumping around or springing out of shape while it is being operated on by a hammer, and the disk may be readily removed from the device for heating, or other purpose without removing or adjusting any of the parts of the device. The disk is freely rotatable on the pivot to arrange any portion of its edge on the anvil. Every blow of a hammer upon the disk jars the anvil and the disk, but as the arms 14 of the disk holder rest against the anvil, the weight of the latter will carry the disk holder back to its proper position, and to this extent the disk holder is self-acting.

Having thus fully described my invention, what I claim as new and desire to secure by Letters Patent, is:—

1. A disk holder or rest comprising a bracket provided with a top bar arranged at an inclination and having a longitudinal slot, a seat consisting of a transverse bar arranged above and supported by the top bar of the bracket, said seat being curved and set at an inclination at one side of an anvil in position to permit the edge of a disk to rest upon the anvil, an inclined pivot having a lower threaded end and piercing and engaging the seat and operating in the said slot to permit the seat to be moved toward and from the anvil, and a nut arranged on the threaded end of the pivot and located below and engaging the said top bar for securing the seat in its adjustment.

2. A disk holder or rest provided with a pivot for a disk and having a seat for the disk contiguous to the pivot, said disk holder or rest bearing against and slidable vertically along one side of an anvil to permit the edge of the disk to rest thereon, and means for securing the disk holder or rest to the support for the anvil, whereby the disk holder or rest is adapted to vibrate independently of the anvil.

3. A disk holder or rest comprising an inclined bracket bearing against and slidable vertically along one side of an anvil and provided with a depending stem, a disk-receiving pivot carried by the bracket and arranged at an inclination to permit the edge of the disk to rest upon the anvil, and means for adjustably securing the stem to the support for the anvil to permit the bracket to vibrate independently of the anvil and also to enable the bracket to be adjusted vertically to vary the bevel of the disk.

4. A disk holder or rest comprising an inclined bracket bearing against and slidable vertically along one side of an anvil and provided with a depending stem, a disk-receiving pivot carried by the bracket and arranged at an inclination to permit the edge of the disk to rest upon the anvil, and means for adjustably securing the stem to the support for the anvil to permit the bracket to vibrate independently of the anvil, said means including upper and lower eyes extending from the said anvil support and receiving the lower portion of the stem, and a clamping screw carried by one of the eyes and engaging the stem.

5. A disk holder or rest comprising a bracket having an inclined top portion provided at the lower end with arms arranged to fit against an anvil, and a disk-receiving pivot mounted on the bracket.

In testimony that I claim the foregoing as my own, I have hereto affixed my signature in the presence of two witnesses.

PAUL LIER.

Witnesses:
  WEBB KELLOGG,
  GEO. H. HAASE.